United States Patent
Teichmann

(10) Patent No.: US 7,596,002 B2
(45) Date of Patent: Sep. 29, 2009

(54) POWER CONVERSION SYSTEM AND METHOD

(75) Inventor: Ralph Teichmann, Cohoes, NY (US)

(73) Assignee: General Electric Company, Niskayuna, NY (US)

(*) Notice: Subject to any disclaimer, the term of this patent is extended or adjusted under 35 U.S.C. 154(b) by 567 days.

(21) Appl. No.: 10/877,359

(22) Filed: Jun. 25, 2004

(65) Prior Publication Data
US 2005/0286268 A1 Dec. 29, 2005

(51) Int. Cl.
*H02M 3/335* (2006.01)
(52) U.S. Cl. .............. 363/18; 363/20; 363/69; 363/71
(58) Field of Classification Search ........... 363/16, 363/18–26, 65, 67, 68, 69, 71, 98; 318/139
See application file for complete search history.

(56) References Cited

U.S. PATENT DOCUMENTS

| | | | | |
|---|---|---|---|---|
| 4,742,208 A | * | 5/1988 | Overman | 363/98 |
| 5,589,743 A | * | 12/1996 | King | 318/139 |
| 6,504,132 B1 | * | 1/2003 | Church | 363/89 |
| 6,529,389 B2 | * | 3/2003 | Perlick et al. | 363/20 |
| 6,570,128 B1 | | 5/2003 | Mela | 219/130.1 |
| 2004/0223351 A1 | * | 11/2004 | Kurokami et al. | 363/65 |

FOREIGN PATENT DOCUMENTS

JP 7233493 9/1995

* cited by examiner

*Primary Examiner*—Jessica Han
(74) *Attorney, Agent, or Firm*—Patrick K. Patnode

(57) ABSTRACT

A power conversion system comprises a converter coupled to a power source and configured to convert a DC power to a variable AC power signal. The power conversion system may further comprise a process control unit coupled to the converter and configured to control the variable AC power signal. The power conversion system may also further comprise a transformer having a primary side and a secondary side, the primary side receiving the variable AC power signal from the converter and a passive rectifier coupled to the secondary side of the transformer. The transformer may be adapted to provide galvanic isolation between the power source and an electro-chemical process. The passive rectifier is adapted to convert the variable AC power to the variable DC power and to deliver the variable DC power to the electro-chemical processing unit.

39 Claims, 3 Drawing Sheets

POWER CONVERSION SYSTEM AND METHOD

BACKGROUND

The invention relates generally to power conversion systems, and more specifically to a power conversion system and method that may be adapted for use in connection with an electro-chemical process.

Electro-chemical processes include processes where metal is deposited on a substrate by passing a current through an electrolyte. A typical electro-chemical cell such as an electrolyzer may include an anode, which is the source of the material to be deposited. An electrolyte, which is a medium through which metal ions are exchanged, may also be included. An electrolyzer may further include a cathode, which may comprise the substrate to be coated. The anode may be connected to the positive terminal of a power supply and the cathode may be connected to the negative terminal of the power supply. When a voltage is applied between the anode and the cathode, positive metal ions from the electrolyte are attracted to the cathode and deposited thereon. As replenishment for these deposited ions, the metal from the anode is dissolved and transferred into the electrolyte to balance the ionic potential.

Electro-chemical process may be utilized for production of hydrogen. Water is charged with electric current during electrolysis, to split water into hydrogen and oxygen. The charge breaks a chemical bond between the hydrogen and oxygen, creating charged particles called ions. Hydrogen is collected at the cathode and oxygen is collected at the anode. A voltage required for performing electrolysis, increases or decreases depending on change in temperature and pressure.

Electro-chemical processes may be characterized by specific requirements regarding the controllability, magnitude and quality of the direct current. Relatively large electro-chemical processes may require direct current of a magnitude of many kilo-amperes with relatively small ripple content. Electro-chemical processes may also benefit from a galvanic isolation of the process from a power supply grid that provides power to the process to enable an independent electric safety concept for the electro-chemical process. Galvanic isolation may reduce the circulation of undesired currents through the plant equipment.

Conventional power conversion systems may comprise power converters with a grid isolation transformer and an active thyristor-based step-down rectifier provided between the power supply grid and the process side. However, conventional power conversion systems may suffer from poor power quality typically associated with the inability to adjust the input power factor and harmonic content of the input currents. In the conventional power conversion process, AC power at fundamental grid frequency is converted to low voltage DC power. Due to operation at the typically low grid frequencies, relatively heavy and bulky transformers may be needed. Conventional power systems are also characterized by the fact that the electro-chemical process is controlled by active power semiconductors placed in the process current path. Since the process current is typically very high this requires active devices with a very high current carrying capability and leads to high power conversion losses.

Accordingly, a technique is desirable that helps in the achievement of high power quality and power factor while avoiding active semiconductors in the high current path.

BRIEF DESCRIPTION

In accordance with one aspect of the present technique, a power conversion system may comprise a converter coupled to a power source and configured to convert a fixed frequency, fixed voltage AC power to AC power with a variable frequency, voltage or current. The power conversion system may further comprise a process control unit coupled to the converter and configured to control the output power by adjusting voltage, current or frequency of the output signal. The power conversion system may further comprise an input power quality control unit coupled to the converter and configured to control the input power quality by adjusting the phase angle and the voltage and current waveforms. The power conversion system may also further comprise a transformer having a primary side and a secondary side, the primary side receiving the variable AC power signal from the converter and a passive rectifier coupled to the secondary side of the transformer. The transformer may be adapted to provide galvanic isolation between the power source and the electro-chemical process. The passive rectifier is adapted to convert the variable AC power to a variable DC power and to deliver the variable DC power to the electro-chemical processing unit.

In accordance with another aspect of the present technique, a method of operating a power conversion system for an electro-chemical process is provided. The method may comprise converting a power signal of a DC power source to a variable AC power signal and employing a transformer having a primary side and a secondary side to provide galvanic isolation between the power source and the electro-chemical process. The method may further comprise delivering the variable AC power signal to the primary side of the transformer and controlling an output power signal generated on the secondary side of the transformer via a process control unit provided at the primary side of the transformer. The method may also further comprise rectifying the output power signal generated at the secondary side of the transformer via a passive rectifier and delivering the rectified power signal to the electro-chemical processing unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
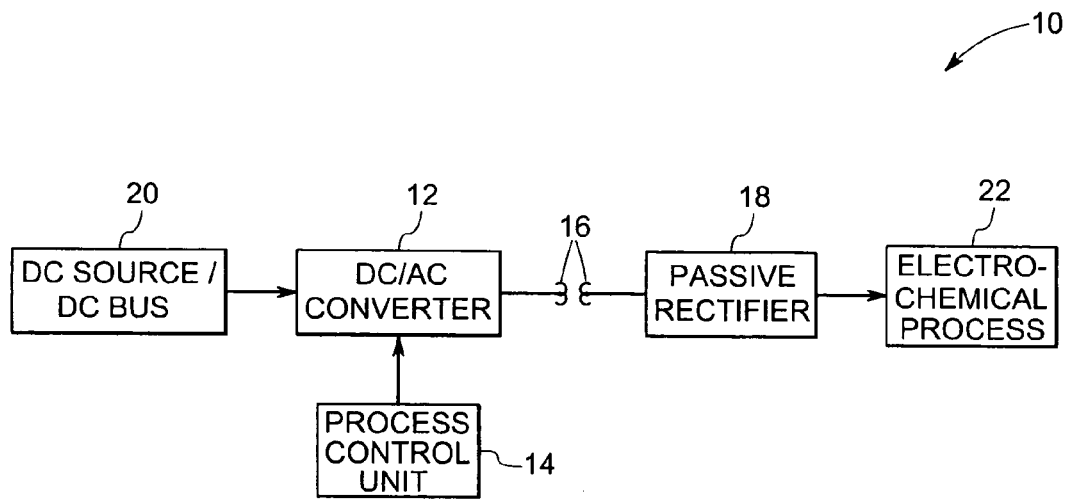
FIG. 1 is a diagrammatical view of a power conversion system coupled to a DC source in accordance with one aspect of the present technique.

Referring now to FIG. 1, a power conversion system, represented generally by the reference numeral 10, is illustrated. The power conversion system 10 comprises a converter 12, a process control unit 14, a transformer 16, and a passive rectifier 18. In the illustrated embodiment, the converter 12 may be coupled to a DC power source 20. The DC power source 20 may include a photovoltaic system, a solar cell, a battery, a DC transmission line, a high voltage DC bus or the like.

The converter 12 is configured to convert a power signal transmitted from the DC power source 20 to a controllable AC power signal. As appreciated by those skilled in the art, the converter 12 may include a single-phase inverter, a multi-phase inverter, or a multi-level inverter, or a parallel configuration or a combination thereof. The process control unit 14 is coupled to the converter 12 and is configured to control various characteristics such as frequency, magnitude, power factor, ripple content, and harmonic content of the variable AC power signal. The converter 12 may also be coupled to a primary side of the transformer 16. The passive rectifier 18 may be coupled to a secondary side of the transformer 16 and is adapted to convert the variable AC signal to a DC power signal.

As appreciated by those skilled in the art, the transformer 16 may be a single-phase transformer or a multi-phase transformer. The passive rectifier 18 may include a single-phase rectifier, a multi-phase rectifier, or a multi-phase multi-pulse rectifier. In the illustrated embodiment, an electro-chemical processing unit 22 is coupled to the passive rectifier 18 to receive power there from. The electro-chemical processing unit 22 may perform a hydrogen production process by electrolysis, an electro-chemical machining process, an electro-polishing process, an electro-synthesis process or the like. The transformer 16 is provided to convert low voltage, high current AC to high voltage low current AC. The transformer 16 additionally provides a galvanic isolation between the power source 20 and the electro-chemical processing unit 22. Galvanic isolation means that the transformer 16 uses a magnetic circuit to decouple the electric circuits of the power source and that of the electro-chemical process.

Figure 2:
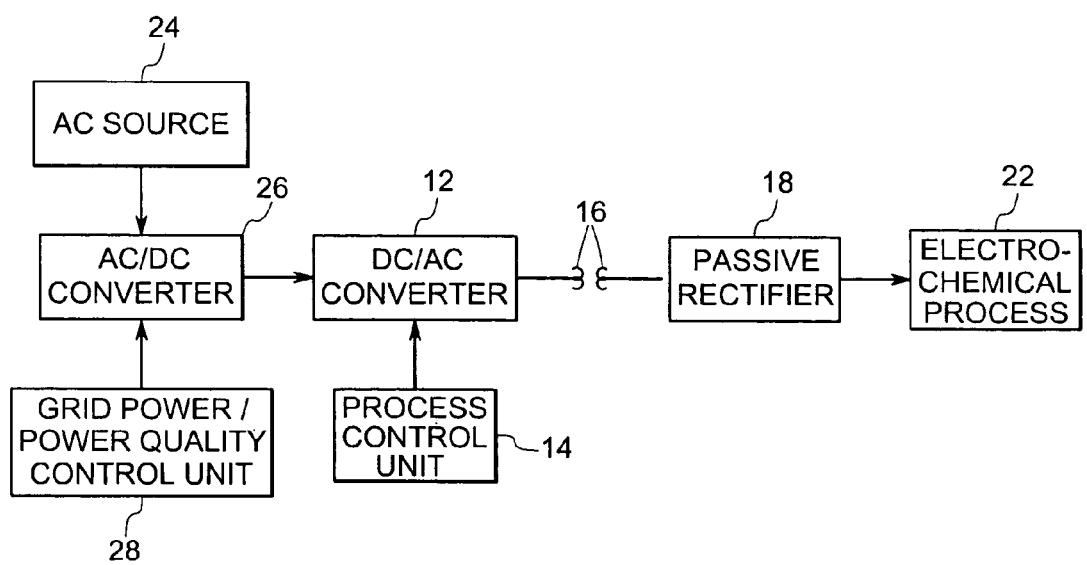
FIG. 2 is a diagrammatical view of a power conversion system coupled to an AC source in accordance with aspects of the present technique.

Referring generally to FIG. 2, a power conversion system in accordance with another aspect of the present technique is illustrated. In the illustrated embodiment, the converter 12 of the power conversion system 10 is coupled to an AC power source 24 via a power source rectifier 26. The AC power source may comprise either a single phase AC source or a multi-phase AC source and may comprise a wind turbine generator, regular electricity grid, gas turbine, diesel generator, water turbine generator or the like. The power source rectifier 26 is configured to convert an AC power signal transmitted from the AC power source 24 to a DC power signal. A power quality control unit 28 is coupled to the power source rectifier 26 and is configured to control the quality characteristics of power supplied for the electro-chemical process. The quality characteristics may include power factor, ripple content and harmonic content of the power supply, among others.

Figure 3:
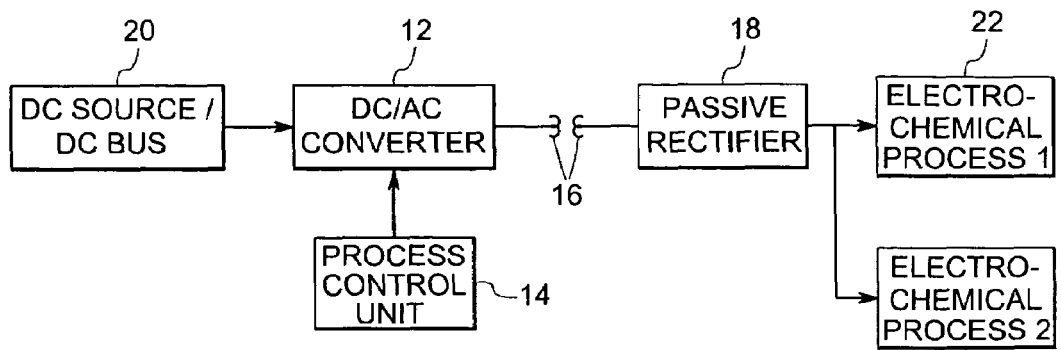
FIG. 3 is a diagrammatical view of a power conversion system coupled to a plurality of electro-chemical processes implemented according to an aspect of the present technique.

Referring generally to FIG. 3, another embodiment of the power conversion system 10 is illustrated. The converter 12 of the power conversion system may be coupled to the DC power source 20. In the embodiment illustrated in FIG. 3, a plurality of electro-chemical processing units 22, 30 are coupled to the passive rectifier 18. Thus, the power conversion system provides power to plurality of electro-chemical processing units 22, 30.

Figure 4:
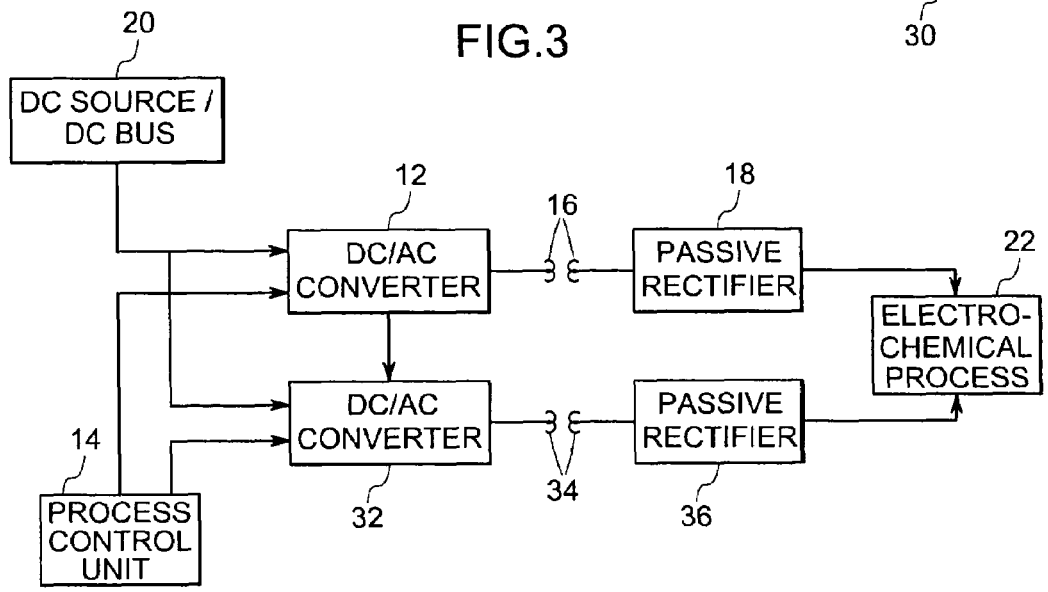
FIG. 4 is a diagrammatical view of a multi-channel power conversion system coupled to an electro-chemical process implemented according to an aspect of the present technique.

Referring generally to FIG. 4, a further embodiment of the power conversion system according to the present technique is illustrated. In the embodiment shown in FIG. 4, the power conversion system comprises a plurality of converters 12, 32 coupled to the DC power bus 20. The DC bus can be powered by a DC source or connected to the AC source 24 via an AC/DC converter 26 as shown in FIG. 2. The process control unit 14 is coupled to the plurality of the converters 12, 32 and configured to control the frequency or magnitude of the variable AC power signals. The converters 12, 32 are coupled via corresponding transformers 16, 34 to plurality of passive rectifiers 18, 36. As appreciated by those skilled in the art, the transformers may be arranged in series or parallel, depending on the specific application. The electro-chemical processing unit 22 may be coupled to the passive rectifiers 18, 36. In accordance with aspects of the illustrated embodiment, the power conversion system provides power to the electro-chemical processing unit 22 via a plurality of channels.

Figure 5:
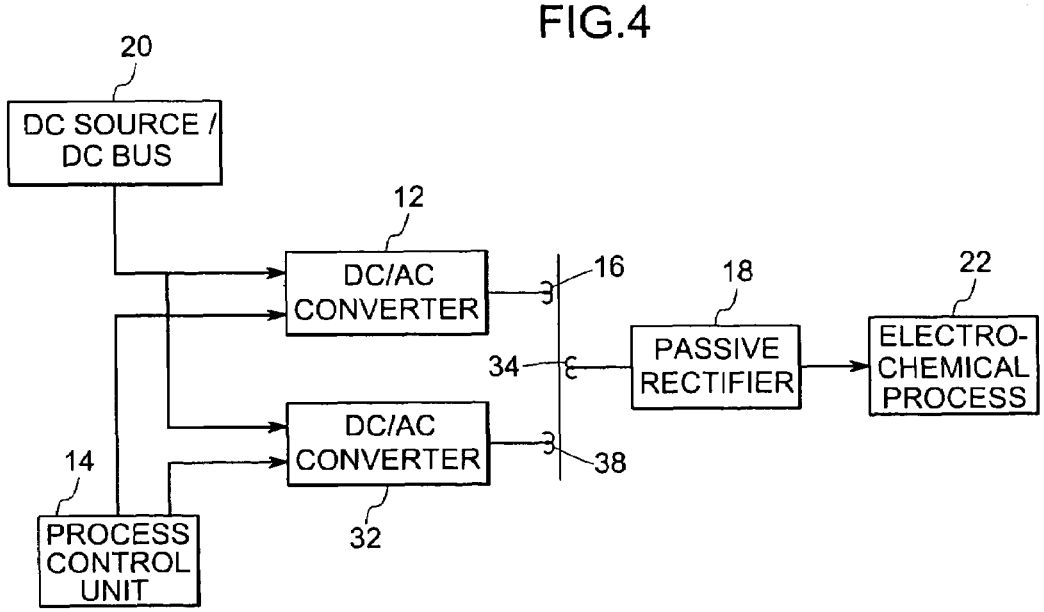
FIG. 5 is a diagrammatical view of a multi-channel magnetically coupled power conversion system coupled to an electro-chemical process implemented according to aspects of the present technique.

Referring generally to FIG. 5, a further embodiment of the power conversion system in accordance with the present technique is illustrated. In accordance with the aspects of the illustrated embodiment, a plurality of converters 12, 32 are coupled to the DC power source 20. The converters 12, 32 are also coupled to the passive rectifier 18 via a plurality of transformers 16, 34, 38. The transformers are mutually coupled magnetically. The magnetically coupled power conversion system provides power to the electro-chemical processing unit 22.

Figure 6:
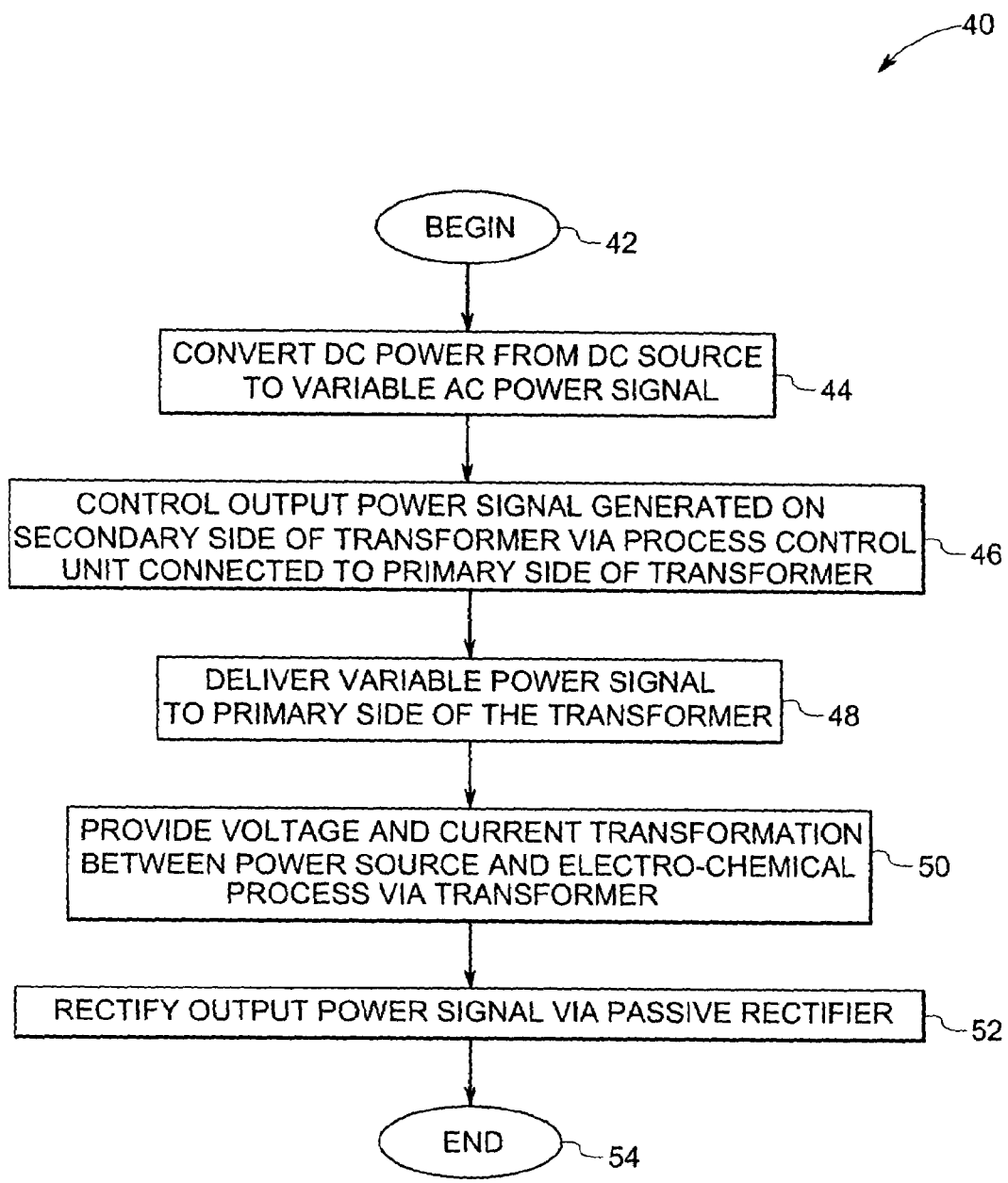
FIG. 6 is a flow chart illustrating a method of operating a power conversion system for an electro-chemical process in accordance with aspects of the present technique.

FIG. 6 is a flow chart illustrating a process in accordance with embodiments of the present technique. The general conversion process, which is designated by the reference numeral 40, may begin with transmission of power from the DC power source, as indicated at step 42 of FIG. 6. At step 44, the DC power from the DC source is converted to variable AC power signal via the power converter. This conversion may be in any range, depending on the application. For purposes of example only, the conversion may be from 800V DC to 400V AC. The nominal DC input values for power converter may comprise 12V DC, 24V DC, 48V DC, 110V DC, 125V DC, 250V DC, 1500V DC, 3000V DC or the like.

Embodiments of the present technique may allow control of many factors affecting quality of output power to be performed on the primary side of the transformer rather than the secondary side. Steady state and dynamic characteristics such as frequency, magnitude, ripple content, and harmonic content of the output power generated on the secondary side may be controlled via the process control unit provided at the primary side, as indicated at the reference numeral 46. The control of such factors on the primary side of the transformer may allow the number and complexity of components in the secondary side to be reduced.

At step 48, the variable AC power signal is delivered to the primary side of the transformer. At step 50, the transformer provides voltage and current transformation between the power source and the electro-chemical process. The transformer also provides galvanic isolation between the power source and an electro-chemical process. The transformer performs the isolation of the power source while magnetically coupling the required power from the power source to the electro-chemical processing unit. At step 52, the variable AC power signal is converted to a variable DC power signal via a passive rectifier. At step 54, the DC power signal is delivered to an application such as an electro-chemical processing unit.

Alternately, when the power source is an AC source, the general power conversion process may begin with transmission of power from the AC source. The variable AC power from the AC power source may be converted to DC power signal via the power source rectifier. The power quality control unit may control the quality characteristics such as power factor, harmonic content, and ripple content of the power supplied for the electro-chemical process. Subsequently steps 44 through step 54 may be performed as previously mentioned above until the power is delivered to an application such as an electro-chemical processing unit.

Embodiments of the present technique may also be adapted to be used with other applications such as wind mills, arc welding processes, fuel cells, storage batteries, storage capacitors, mobile applications (such as in ships) and the like. One advantage provided by embodiments of the present technique may be that the number of components and complexity on the secondary side of the transformer is reduced because the output power signal for the electro-chemical process is controlled on the primary side of the transformer. It may therefore be advantageous to employ a passive rectifier on the secondary side of the transformer. As a result, robustness and power efficiency may be improved and losses reduced. Moreover, the overall quality characteristics of the power supply such as magnitude, frequency, power factor, ripple content, harmonic content and the like may be improved.

Another advantage of the present technique may be that the converter converts a low voltage, DC power signal from the power source to a medium or high frequency, low or medium voltage AC power signal. The frequency of the output power signal for an electro-chemical process may therefore be advantageously adjustable at the primary side depending on the particular application. High frequency switching may allow the use of relatively small transformers. Therefore, embodiments of the present technique may be relatively light and compact. Reducing the size of the transformer may be useful especially for mobile applications such as in ships, robots and the like. The transformer may additionally improve the power conditioning capability of the system by effectively absorbing or reducing spikes and electrical noise generated in the power supply. A reduction of undesirable circulation of current through the load being powered by the system may also be achieved by using the transformer.

While certain features of the invention have been illustrated and described herein, many modifications and changes will occur to those skilled in the art. It is, therefore, to be understood that the appended claims are intended to cover all such modifications and changes as fall within the true spirit of the present technique.

The invention claimed is:

1. A power conversion system, comprising:
   a converter coupled to a power source and configured to convert a DC power to a variable AC power signal;
   a process control unit coupled to the converter and configured to control at least one characteristic of the variable AC power signal;
   a transformer having a primary side and a secondary side, the primary side receiving the variable AC power signal from the converter, the transformer adapted to provide a transformation of current and voltage levels between the power source and an electro-chemical processing unit;
   a passive rectifier coupled to the secondary side of the transformer, the passive rectifier being adapted to convert the variable AC power to the variable DC power and to deliver the variable DC power to the electro-chemical processing unit.

2. The system of claim 1, wherein the passive rectifier is a single phase rectifier.

3. The system of claim 1, wherein the passive rectifier is a multi-phase rectifier.

4. The system of claim 1, wherein the passive rectifier is a multi-phase, multi-pulse rectifier.

5. The system of claim 1, wherein the power source is a DC source.

6. The system of claim 1, wherein the power source is an AC source.

7. The system of claim 6, wherein the converter is coupled via a power source rectifier to the AC source.

8. The system of claim 7, further comprising a power quality control unit coupled to the power source rectifier, the power quality control unit being configured to control a quality of input power for the electro-chemical process.

9. The system of claim 1, wherein the converter is a single phase inverter.

10. The system of claim 1, wherein the converter is a multi-phase inverter.

11. The system of claim 1, wherein the converter is a multi-level inverter.

12. The system of claim 1, wherein the transformer is further adapted to provide galvanic isolation between the power source and the electro-chemical processing unit.

13. The system of claim 1, wherein the transformer is a single phase transformer.

14. The system of claim 1, wherein the transformer is a multi-phase transformer.

15. The system of claim 1, wherein the system is adapted for use in a mobile application.

16. The system of claim 1, wherein the system is adapted for use in a wind mill.

17. The system of claim 1, wherein the system is adapted for use in an arc welding process.

18. The system of claim 1, wherein the system is adapted for use in a fuel cell.

19. The system of claim 1, wherein the system is adapted for use in a storage battery.

20. The system of claim 1, wherein the system is adapted for use in a storage capacitor.

21. The system of claim 1, wherein the system is adapted for use in an electrolyzer.

22. A power conversion system, comprising:
    a plurality of converters coupled to a power source and configured to convert a DC power to a variable AC power signal;
    a process control unit coupled to each one of the plurality of converters and configured to control at least one characteristic the variable AC power signal;
    a transformer having a primary side and a secondary side, the primary side receiving the variable AC power signal from the converter, the transformer adapted to provide a transformation of current and voltage levels between the power source and an electro-chemical processing unit; and
    a passive rectifier coupled to the secondary side of the transformer, the passive rectifier being adapted to convert the variable AC power to the variable DC power and to deliver the variable DC power to the electro-chemical processing unit.

23. The system of claim 22, wherein the transformer is further adapted to provide galvanic isolation between the power source and the electro-chemical processing unit.

24. The system of claim 22, wherein the plurality of transformers are mutually coupled magnetically.

25. The system of claim 22, wherein the plurality of transformers are arranged in parallel.

26. The system of claim 22, wherein the plurality of transformers are arranged in series.

27. The system of claim 22, wherein the passive rectifier is adapted to provide power to a hydrogen production process.

28. The system of claim 22, wherein the electro-chemical processing unit is adapted to perform an electro-chemical machining process.

29. The system of claim 22, wherein the electro-chemical processing unit is adapted to perform an electro-polishing process.

30. The system of claim 22, wherein the electro-chemical processing unit is adapted to perform an electro-synthesis process.

31. A method of operating a power conversion system, the method comprising:

converting a DC power signal of a DC power source to a variable AC power signal;

employing a transformer having a primary side and a secondary side to provide a transformation of current and voltage levels between the power source and an electro-chemical processing unit;

delivering the variable AC power signal to the primary side of the transformer;

controlling at least one characteristic an output power signal generated on the secondary side of the transformer via a process control unit provided at the primary side of the transformer;

rectifying the output power signal generated at the secondary side of the transformer via a passive rectifier to create a rectified power signal; and delivering the rectified power signal to the electro-chemical processing unit.

32. The method of claim 31, wherein controlling at least one characteristic the output power signal comprises controlling a plurality of power quality characteristics of the output power signal.

33. The method of claim 32, wherein the power quality characteristic is a magnitude of the output power signal.

34. The method of claim 32, wherein the power quality characteristic is a ripple content of the output power signal.

35. The method of claim 32, wherein the power quality characteristic is a harmonic content of the output power signal.

36. The method of claim 31, further comprising providing galvanic isolation between the power source and the electro-chemical processing unit via the transformer.

37. The method of claim 31, further comprising converting an AC power signal of an AC power source to the variable DC power signal.

38. A power conversion system, comprising:

a converter coupled to a power source and configured to convert a DC power to an AC power signal;

a transformer having a primary side and a secondary side, the primary side receiving the AC power signal from the converter, the transformer adapted to provide a transformation of current and voltage levels between the power source and an electro-chemical processing unit;

a process control unit coupled to the converter and provided at the primary side of the transformer and configured to control a plurality of quality characteristics of an output power signal generated on the secondary side of the transformer; and a passive rectifier coupled to the secondary side of the transformer, the passive rectifier being adapted to convert the output power signal to create a rectified power signal and to deliver the rectified power signal to the electro-chemical processing unit.

39. The system of claim 38, wherein the plurality of quality characteristics comprises at least one of a magnitude; a ripple content; or a harmonic content of the output power signal.

\* \* \* \* \*

UNITED STATES PATENT AND TRADEMARK OFFICE
CERTIFICATE OF CORRECTION

PATENT NO. : 7,596,002 B2  Page 1 of 1
APPLICATION NO. : 10/877359
DATED : September 29, 2009
INVENTOR(S) : Ralph Teichmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Twenty-eighth Day of September, 2010

David J. Kappos
*Director of the United States Patent and Trademark Office*